United States Patent Office 3,306,923
Patented Feb. 28, 1967

3,306,923
DIALKYL-ALKALI ALUMINATES AND THEIR PREPARATION
Georges Wetroff, Le Thillay, and Emile Trebillon and Jean Pierre Sassoulas, Paris, France, assignors to Pechiney Compagnie de Produits Chimiques et Electrometallurgiques, Paris, France
No Drawing. Filed Nov. 14, 1962, Ser. No. 237,725
Claims priority, application France, Nov. 15, 1961, 879,005
9 Claims. (Cl. 260—448)

This invention relates to organo-metallic compounds having the general formula

I in which R is a radical of the type alkyl, arylalkyl and cycloalkyl, hereinafter referred to and in the claims as an alkyl radical and which may be represented by methyl, ethyl, propyl, isopropyl, butyl, amyl, hexyl, and heptyl to octadecyl and higher; cyclopentyl, cyclohexyl, tolyl, methallyl naphthyl, anthracyl, benzyl, phenyl ethyl, benzyl ethyl; methallyl, vinyl, allyl; and in which the above may be substituted or unsubstituted, saturated or unsaturated, and M is an alkali metal. This invention also relates to a process for the preparation of such compounds and their use as promoters in the preparation of organo-aluminum compounds by direct reaction of hydrogen, olefinic hydrocarbons and metallic aluminum.

It is an object of this invention to produce organo-metallic compounds of the type described and to provide a new and improved process for the manufacture of same, and it is a related object to provide a new and improved process for the preparation of organo-aluminum compounds by direct reaction of hydrogen, olefinic hydrocarbons and metallic aluminum in which use is made of the organo-metallic compound of this invention as a promoter.

The compounds of this invention, as represented by Formula I, are characterized by an atomic ratio of aluminum to alkali metal of 1 to 1. These are to be distinguished from compounds of the type heretofore produced, as represented by:

$$Na[(C_2H_5)_3Al-O-Al(C_2H_5)_2]$$

in which the atomic ratio of aluminum to sodium is 2.

In the preparation of the organo-metallic compounds of this invention, an alkali metal hydroxide is reacted with dialkyl aluminum monohydride in about equimolecular proportions in accordance with the following equation:

$$R_2AlH + MOH \rightarrow R_2Al-OM + H_2 \qquad II$$

The reaction is carried out at elevated temperature, as by prolonged heating at a temperature within the range of 100–180° C.

Instead of making use of a dialkyl aluminum monohydride in the above reaction, use can be made of trialkyl aluminum which dissociates under the reaction conditions to form olefin and dialkyl aluminum hydride. Such dissociation is carried out at a high temperature which is accompanied with the continuous elimination of the olefin as it is formed. Such dissociation of trialkyl aluminum under the conditions described is easily achieved when the alkyl group or groups bound to the aluminum are branched on the $C_2$ carbon, as represented by the compound tris(methyl-2 pentyl) aluminum.

The ingredients can be reacted in theoretical amounts but it is preferred, when it is desired to drive the reaction substantially to completion for substantially total reaction, to have the alkali metal hydroxide present in an amount in excess of theoretical and more particularly in an excess corresponding to about 10 to 100 percent by weight of the theoretical amount.

To achieve a total reaction, it is preferred to carry out the reaction in a chemically inert diluent in which the organo-metallic product is soluble. However, the ingredients can be reacted in the absence of such diluent but then the reaction medium becomes viscous and it becomes more difficult to achieve a total reaction. As the diluent, it is preferred to make use of a hydrocarbon, such as toluene, xylene and the like. When such diluent is used, the reaction temperature will correspond to about the boiling point or reflux temperature of the diluent, at normal pressure.

The progress of the reaction, which may last for several hours, can be followed by measurement of the amount of hydrogen that is released. Upon completion of the reaction, the excess metal hydroxide is separated, as by filtration, leaving the organo-metallic compound in solution in the toluene or other solvent which is used as the diluent. The compound can be reduced to a solid state by removal of the solvents, such as by distillation at low pressure and preferably at a subatmospheric pressure.

The products of this invention, namely, the compounds represented by the formula $R_2Al-ONa$ or $R_2Al-OK$, are generally amorphous white powders which are soluble in hydrocarbons and sensitive to air and moisture. The compounds have properties which are characteristic of the alkyl aluminum compounds in that they hydrolyze in the presence of moisture and oxidize in the presence of oxygen, as represented by the following equations:

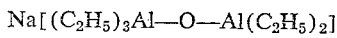
$$R_2Al-ONa + 3H_2O \longrightarrow Al(OH)_3 + NaOH + 2RH$$
III

$$R_2Al-ONa + \tfrac{1}{2}O_2 \longrightarrow \underset{R}{VROAlONa}$$
IV The compounds of this invention find new and novel use as an activator in the direct synthesis of alkyl aluminum compounds by reaction of metallic aluminum, hydrogen and olefinic hydrocarbons having double terminal or internal bond. The activator operates to speed the reaction with aluminum and it minimizes side reactions, such as the undesirable formation of saturated hydrocarbons. In the light of the solubility of the compounds of this invention, use can be made of the activator in a preferred dissolved state in the reaction medium thereby to facilitate its use by comparison with insoluble, solid activators of the type heretofore employed, as represented by alkali metals, their hydroxides or their carboxylates. The compounds of this invention exhibit a high degree of activity as an accelerator at concentration as low as 0.00001 molecular weights per atomic weight of aluminum. Concentrations as high as 0.2 molecular weights per atomic weight of aluminum can be used and it is preferred to make use of about 0.0005 molecular weights per atomic weight of aluminum.

The following examples are given by way of illustration of the practice of this invention, and not by way of limitation:

EXAMPLE 1

The following mixture is heated with stirring under an inert atmosphere (argon) and under positive pressure:

| | Grams |
|---|---|
| Bis(methyl 2-pentyl) aluminum hydride (97% $AlR_2H$) | 46 |
| Toluene dried on sodium | 100 |
| Pure sodium hydroxide in pellet form | 13 |

The mixture is refluxed for 16 hours. During this time, the total volume of hydrogen which is given off will amount to about 5 liters at 20° C. under 760 mm. of mercury. After cooling, the solution is filtered under a low pressure of argon and analysis of the solution gives a sodium and aluminum content as follows in the toluene solution:

| | Percent |
|---|---|
| Sodium | 2.8 |
| Aluminum | 3.24 |

The solution is subdivided into one part from which the solvent is eliminated by distillation under a reduced pressure of 1 mm. of mercury to a final temperature of 120° C. The product is a friable solid having the following analysis:

Found: Al, 12.33%; Na, 10.77%. Theoretical for NaOAl $(C_6H_{13})_2$: Al, 11.4%; Na, 9.75%.

A yield of 44 grams is obtained which amounts to about 80% of theoretical.

EXAMPLE 2

Preparation of tris(methyl-2 pentyl) aluminum:

The preparation of the above compound is effected by making react the following components: aluminum having a purity of 99.5%, in the form of granules of from 0.25 to 0.75 mm., hydrogen, methyl-2 pentene-1 (which is previously distilled over an organo aluminum compound of boiling point equal to 60–62° C. at N.T.P.), a relatively small quantity of tris(methyl-2 pentyl) aluminum issued from a former operation as an initiator, and finally a toluenic solution of an organo-metallic compound of this invention used as an activator.

The reaction is carried out at 150° C. with stirring in an autoclave having a capacity of about 1 liter and in which the hydrogen pressure is maintained within the range of 75 to 130 kg./cm.² The reactants are present in the following amounts:

200 grams—granulated aluminum
200 grams—methyl-2 pentene-1
55 grams—tris(methyl-2 pentyl) aluminum
3 cm.³ of a solution containing 1.7 gram moles per liter of NaOAl $(C_6H_{13})_2$ The results obtained after four tests are shown in the following table:

For purposes of comparison, the identical tests have been carried out without the activator with the following results:

| Test No. | Percent activator introduced mole/atom Al | Methyl-2 Pentene-1 | | | Speed of attack of aluminum in g./h./l. autoclave |
|---|---|---|---|---|---|
| | | Transformed into aluminum trialkyl, percent | Transformed into methyl-2 pentane, percent | Not transformed, percent | |
| 5 | Nil | 63 | 21 | 13 | 3.3 |
| 6 | Nil | 60 | 22 | 14 | 3.3 |
| 7 | Nil | 61 | 23 | 13 | 3.1 |
| 8 | Nil | 59 | 24 | 13 | 3.3 |

It will be noted from the foregoing that the rate of reaction with the aluminum is considerably greater in the reaction carried out in the presence of the activator as compared to the reaction carried out in the absence of the activator. At the same time, the proportion of hydrogenated product is considerably reduced.

It will be apparent from the foregoing that we have provided a new and improved product and process for manufacture of same and a new and improved use of same in the preparation of organo aluminum compounds.

It will be understood that changes may be made in the details of formulation and operation without departing from the spirit of the invention, especially as defined in the following claims.

We claim:

1. An organo-metallic compound having the general formula

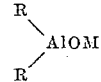

in which R is a radical selected from the group consisting of alkyl, arylalkyl and cycloalkyl, and M is an alkali metal.

2. A process for the preparation of the compound having the general formula

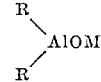

in which R is a radical selected from the group consisting of alkyl, arylalkyl and cycloalkyl, and M is an alkali metal comprising reacting a dialkyl aluminum monohydried with the hydroxide of an alkali metal.

3. The process as claimed in claim 2 in which the dialkyl aluminum monohydride and the metal hydroxide are reacted in equimolecular proportions.

4. The process as claimed in claim 2 in which the reaction is carried out at a temperature within the range of 100–180° C.

5. The process as claimed in claim 2 in which the

| Test No. | Percent activator introduced mole/atom Al | Methyl-2 Pentene-1 | | | Speed of attack of aluminum in g./h./l. autoclave |
|---|---|---|---|---|---|
| | | Transformed into aluminum trialkyl, percent | Transformed into methyl-2 pentane, percent | Not transformed, percent | |
| 1 | 0.06 | 78 | 9 | 7 | 8.3 |
| 2 | 0.06 | 84 | 8 | 7 | 10.2 |
| 3 | 0.06 | 87 | 9 | 3.5 | 10.3 |
| 4 | 0.06 | 88 | 9 | 3.7 | 9.8 | alkali metal hydroxide is present in excess of the theoretical up to an amount of 100 percent excess.

6. The process as claimed in claim 2 in which the reaction is carried out in an inert solvent system in which the product is soluble.

7. The process as claimed in claim 6 in which the solvent is present in an amount within the range of 1 to 3 volumes per volume of dialkyl aluminum monohydride.

8. The process as claimed in claim 2 in which the hydride is incorporated into the reaction as trialkyl aluminum which dissociates under the reaction conditions to the dialkyl aluminum monohydride and an olefin.

9. The process as claim in claim 8 which includes the step of continuously removing the olefin.

No references cited.

HELEN M. McCARTHY, *Acting Primary Examiner.*

H. M. S. SNEED, *Assistant Examiner.*